United States Patent
Imoto

(10) Patent No.: US 6,621,072 B2
(45) Date of Patent: Sep. 16, 2003

(54) VEHICLE-MOUNTED IMAGE PICKUP DEVICE

(75) Inventor: Masayoshi Imoto, Nagoya (JP)

(73) Assignees: Autonetworks Technologies, Ltd., Nagoya (JP); Sumitomo Wiring Systems, Ltd., Mie (JP); Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 09/906,757

(22) Filed: Jul. 18, 2001

(65) Prior Publication Data

US 2002/0014578 A1 Feb. 7, 2002

(30) Foreign Application Priority Data

Jul. 31, 2000 (JP) ........................................ 2000-231212

(51) Int. Cl.[7] ................................................. H01J 5/02
(52) U.S. Cl. ..................... 250/239; 250/208.1; 257/434
(58) Field of Search .............................. 250/208.1, 239, 250/203.3, 203.4, 216; 340/903, 937, 942, 435, 436; 348/148, 118; 257/432, 433, 434, 435

(56) References Cited

U.S. PATENT DOCUMENTS

| | | | | |
|---|---|---|---|---|
| 4,488,141 A | * | 12/1984 | Ohlenforst et al. | ........... 156/99 |
| 5,120,920 A | * | 6/1992 | Moriike | ...................... 200/341 |
| 5,756,988 A | * | 5/1998 | Furuta | ...................... 250/208.1 |
| 6,122,009 A | * | 9/2000 | Ueda | ........................ 348/335 |

* cited by examiner

Primary Examiner—Thanh X. Luu
(74) Attorney, Agent, or Firm—Oliff & Berridge, PLC

(57) ABSTRACT

In a vehicle-mounted image pickup device, when an image pickup device main body requiring waterproof is housed in a case member, the case member includes a translucent housing having window sections which serve as incident window regions; flaw-prevention translucent plates which are laminated on the window sections of the translucent housing so as to be located on the exterior surface side of the translucent housing; and an opaque layer formed in an area other than an area where there are disposed the flaw-prevention translucent plates.

3 Claims, 3 Drawing Sheets

VEHICLE-MOUNTED IMAGE PICKUP DEVICE

BACKGROUND OF THE INVENTION

1. Field of the Invention

The present invention relates to a vehicle-mounted image pickup device which captures an image of vehicle surroundings by means of introducing light entering an incident window area provided on a case member which houses an image pickup main unit.

2. Description of the Related Art

FIG. 3 is a cross-sectional view of a vehicle-mounted image pickup device of this type according to an example proposed by the present inventor. FIG. 4 is an enlarged view of the principal constituent elements shown in FIG. 3.

As shown in FIG. 3, a vehicle-mounted image pickup device comprises a lightproof case member 1 made of industrial plastic; and an image pickup device main unit 3 to be disposed within the case member 1. The vehicle-mounted image pickup device is mounted on an exterior surface of a vehicle, thereby simultaneously capturing blind spots in two directions corresponding to a driver's blind spots among vehicle surroundings. A fixture 5 is attached to the case member 1 for use in mounting the image pickup device on the vehicle.

In a conceivable preferable mode of use of the vehicle-mounted image pickup device, the vehicle-mounted image pickup device is mounted on the front end of the vehicle (e.g., on the front grill). The image pickup device captures front left-side and right-side blind spots of the vehicle.

The image pickup device main unit 3 comprises an image pickup unit 11 and a prism (reflection means) having two reflection surfaces for reflecting, to the image pickup unit 11, a light ray 13L entering from a left-side incident window area (i.e., a blind spot region) and a light ray 13R entering from a right-side incident window area (i.e., a blind spot region). The image pickup device main unit 3 further comprises a hold member 17 for holding the prism 15, and a circuit unit 19 for driving and controlling the image pickup unit 11.

The circuit unit 19 comprises three circuit boards 21 having elements provided thereon. The image pickup 11 is disposed on the three circuit boards 21. The circuit boards 21 are provided with an unillustrated connection section to which is connected a connector 33 coupled to a distal end of a connection cable 31.

The prism 15 has a substantially a triangular prism shape. Of three side surfaces 15a through 15c, two side surfaces (15a and 15b in the present embodiment) are respectively disposed opposite a left-side translucent window 35L and a right-side translucent window 35R provided in the case member 1.

The light ray 13L that has entered the case member 1 by way of the left-side window area through the left-side window 35L enters the prism 15. The light ray 13L is reflected by a left-side side surface 15a of the prism, which serves as a reflection surface, toward the image pickup unit 11, whereby the reflected light is introduced into the image pickup unit 11. Similarly, the light ray 13R that has entered the case member 1 by way of the right-side window area through the right-side window 35R enters the prism 15. The light ray 13R is reflected by a right-side side surface 15b of the prism, which serves as a reflection surface, toward the image pickup unit 11, whereby the reflected light is introduced into the image pickup unit 11.

The light rays 13L and 13R introduced into the image pickup unit 11 enter an image pickup element 11b by way of an imaging lens 11a provided in the image pickup unit 11. As a result, images pertaining to the left-side and right-side incident window areas are formed by the image pickup element 11b. The thus-captured image is output to the outside by way of a cable 31a of a circuit unit 19 or the connection cable 31.

Here, in the window sections 35L and 35R serving as incident window areas of the case member 1, a step 40 is formed in the edge of an opening 39L and in the edge of an opening 39R at the time of formation of the openings 39L and 39R. Translucent plates 37L and 37R made of glass are fitted into corresponding steps 40. Industrial plastic having the same coefficient of expansion as that of the case member 1 can be used for the translucent plates 37L and 37R. However, if the windows 35L and 35R are flawed, images are adversely affected to a great extent. Hence, glass material which is less susceptible to flaws than industrial plastic is used for the translucent plates 37L and 37R.

In the vehicle-mounted image pickup device having the foregoing construction, if rainwater enters the case member 1, dew condenses on an optical system element provided in the image pickup unit 11, thereby deteriorating the image pickup performance. For this reason, when the translucent plates 37L and 37R are fitted to the steps 40 formed around the openings 39L and 39R of the case member 1, the inside of the case member 1 is hermetically sealed by use of an adhesive (not shown).

Reference numeral 43 provided in FIG. 3 designates a heat contraction tube for sealing the inside of a cylindrical section 45 opened in the case member 1 and the connection cable 31. Reference numeral 47 designates a sealing member for sealing a clearance between the cylindrical section 45 and the outermost coating 31b of the connection cable 31.

However, in relation to the waterproof structure according to the proposed example, the inside of the case member becomes hermetic in relation to the outside, thereby inducing a temperature difference between the inside of the case member 1 and the outside thereof. The external air pressure drops relative to the internal pressure of the case member 1 for reasons of the temperature difference. Because of this pressure difference, pressure is exerted on the openings 39L and 39R toward the outside, thereby resulting in danger of weakening the adhesive strength of the adhesive material bonding the translucent plates 37L and 37R to the case member 1.

As mentioned above, when the adhesive strength exerted between the translucent plates 37L and 37R and the case member 1 weakens over time, the air tightness of the area of reduced adhesive strength is deteriorated. As a result, water resistance of the case member 1 is impaired. In some cases, there is a fear of the translucent plates 37L and 37R dropping from the case member 1 because of vehicle vibration.

SUMMARY OF THE INVENTION

The present invention has been conceived against this back drop and is aimed at providing a vehicle-mounted image pickup device which prevents occurrence of damage to an incident window area and has superior performance in preventing deterioration in water resistance.

To solve the problem set forth, the present invention provides a vehicle-mounted image pickup device which introduces light having entered into an image pickup main body housed in the case member through an incident window area formed in a case member, thereby capturing an image relating to vehicle surroundings, wherein the case member comprises a translucent housing whose portions corresponding to the incident window regions are sealed;

a flaw-prevention translucent plate which is stacked on areas corresponding to the incident window regions of the translucent housing and is situated on the exterior surface side; and an opaque layer formed in an area other than the area where the translucent plate of the translucent housing is disposed.

Preferably, recesses are formed in an exterior surface of the incident window regions of the translucent housing, and the translucent plates are fitted into the recesses.

Preferably, the translucent plate is bonded to the translucent housing by means of a translucent adhesive.

DETAILED DESCRIPTION OF THE PREFERRED EMBODIMENTS

Figure 1:
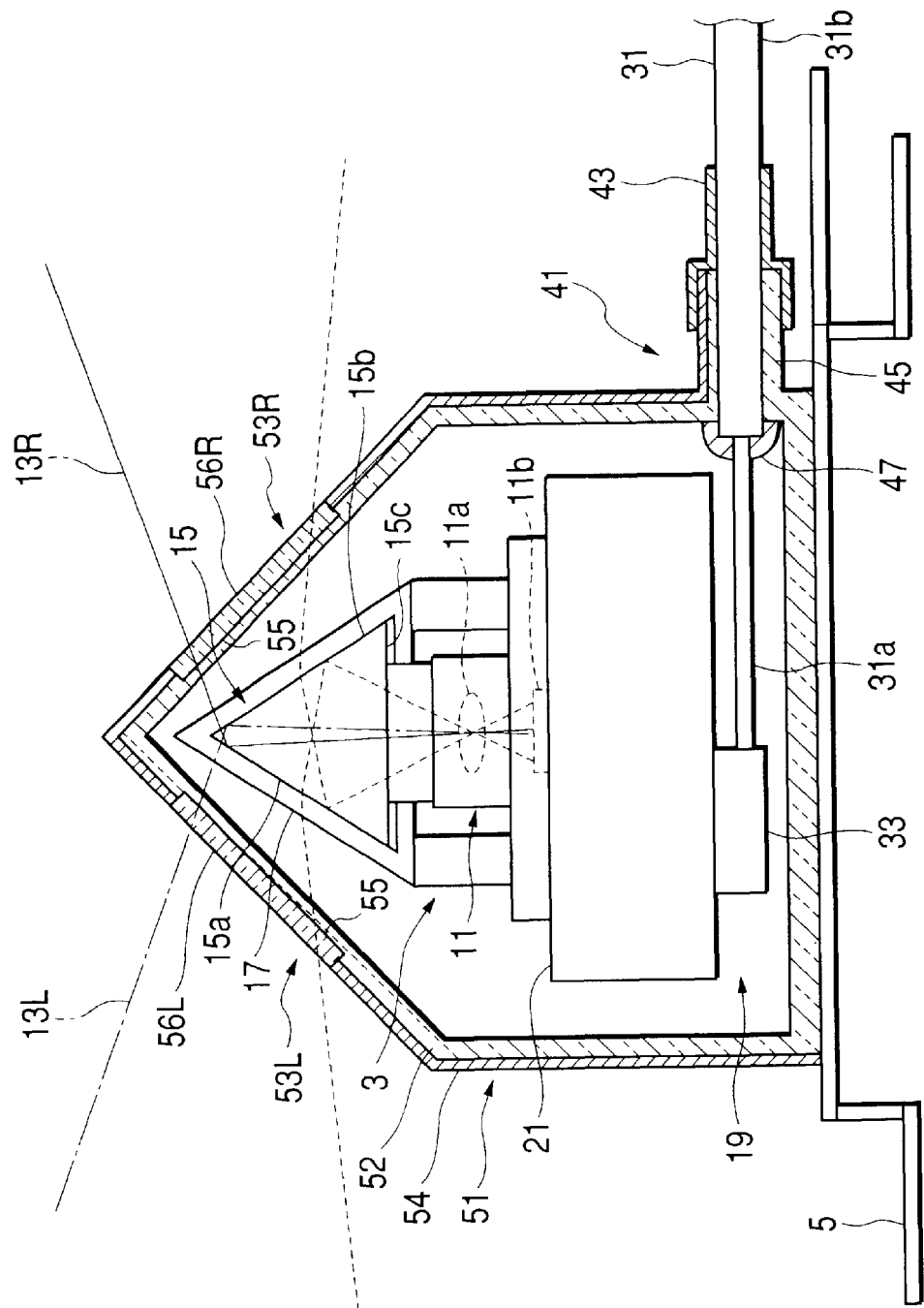
FIG. 1 is a cross-sectional view of a vehicle-mounted image pickup device to which is applied a vehicle-mounted image pickup device according to one embodiment of the present invention.
Figure 2:
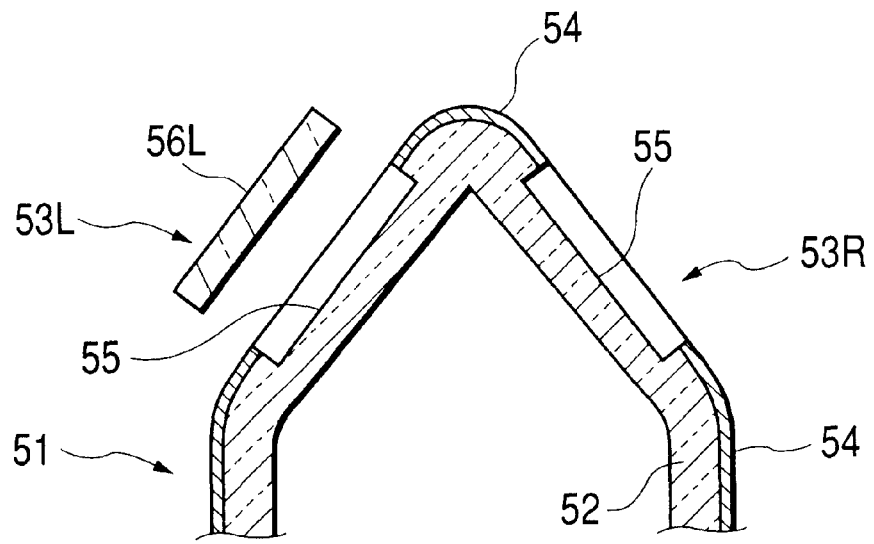
FIG. 2 is an enlarged view of the principal section of the vehicle-mounted image pickup device shown in FIG. 1.
Figure 4:
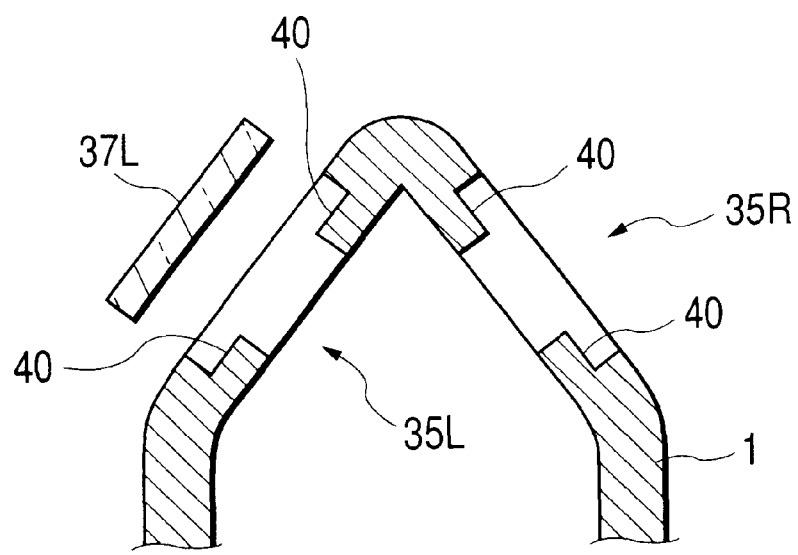
FIG. 4 is an enlarged view of the principal section of the vehicle-mounted image pickup device shown in FIG. 3.
Figure 3:
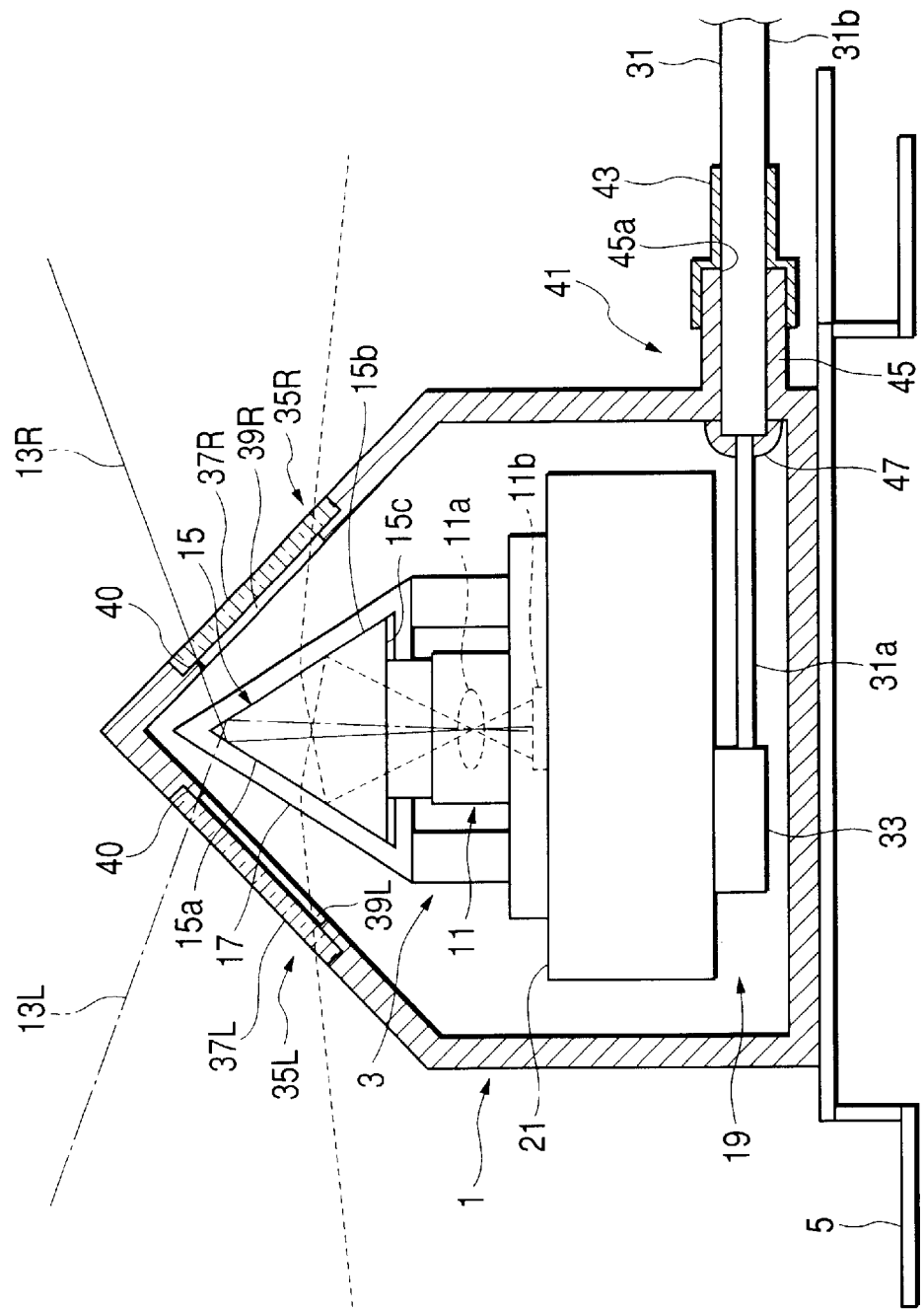
FIG. 3 is a cross-sectional view of a vehicle-mounted image pickup device to which is applied a vehicle-mounted image pickup device according to a proposed example.

FIG. 1 is across-sectional view showing a vehicle-mounted image pickup device according to one embodiment of the present invention; and FIG. 2 is an enlarged cross-sectional view of the principal section of the vehicle-mounted image pickup device. In connection with the structure of the image pickup device shown in FIG. 1, elements corresponding to those showing the configuration of the image pickup device shown in FIG. 3 are denoted by the same reference numerals.

A case member 51 of the vehicle-mounted image pickup device according to the present embodiment comprises a translucent housing 52 formed from translucent industrial plastic. The exterior surface of the translucent housing 52 excluding windows 53L and 53R (incident window areas) is coated with black paint, thereby forming a lightproof film (opaque layer) 54. A translucent glass plate 56L is fitted into a recess 55 which is formed in the window section 53L of the translucent housing 52 as a window section 53L of the case member 51. Similarly, a translucent glass plate 56R is fitted into the recess 55 which is formed in the window section 53R of the translucent housing 52 as the window section 53R of the case member 51.

As shown in FIG. 2, the translucent housing 52, including the window sections 53L and 53R, is formed integrally and hermetically, except a cylindrical section 45 to be used for inserting a connection cable 31. The window sections 53L and 53R according to the present embodiment are formed so as to hermetically seal the inside of the translucent housing 52.

The translucent plates 56L and 56R are formed in identical in shape and size with the recess 55 of the translucent housing 52 and are bonded to the bottoms of the recesses 55 through use of an unillustrated predetermined transparent adhesive.

The translucent plates 56L and 56R of the window sections 53L and 53R are formed from glass plates for the same reasons as those that glass plates are more resistant to flaws than industrial plastic.

In other respects, the image pickup device main body 3 and the fixture 5 are identical in construction with those shown in FIG. 3. Hence, their explanations are omitted.

In the vehicle-mounted image pickup device having the foregoing construction, the exterior surface of the translucent housing 52 of the case member 51, exclusive of the window sections 53L and 53R, is coated with the lightproof film 54. Of the light entered into the vehicle-mounted image pickup device, only light rays 13L and 13R which have entered into the case member 51 from the left and right window sections 53L and 53R through the left and right incident window regions enter the inside of the prism 15. The light rays 13L and 13R are reflected by side surfaces 15a and 15b of the prism 15 acting as reflection surfaces, toward the image pickup unit 11. The thus-reflected light rays are introduced into the image pickup unit 11. The light rays 13L and 13R introduced into an image pickup element 11b by way of an imaging lens provided in the image pickup unit 11, whereby images are of the left and right incident window regions are captured by the image pickup element 11b. The thus-captured images are output to the outside by way of any sheathed cable 31a of the circuit unit 19 and the connection cable 31.

A temperature difference raises between the inside and outside of the case member 51, and a pressure difference due to a temperature difference may arise.

However, in the present embodiment, the window sections 53L and 53R of the translucent housing 52 are maintained hermetically. Since the translucent plates 56L and 56R are fitted into the recesses 55 formed in the translucent housing 52. As in the case of the proposed example, there can be prevented pressing of the translucent plates 56L and 56R toward the outside, which would otherwise be caused by an interior pressure. Consequently, as a matter of course, waterproof of the window sections 53L and 53R can be ensured. Removal of the translucent plates 56L and 56R can be prevented. Further, the translucent plates 56L and 56R can protect the incident window regions from flaws.

According to the present invention, in relation to a case member, a translucent property of corresponding incident window regions is ensured. While the lightproof of the area of the case member other than the window regions is ensured, the air tightness of the areas corresponding to the incident window regions can be ensured by means of only the translucent housing. Consequently, even if a drop arises in the atmospheric pressure relative to the inside of the case member, the translucent plate can be prevented from being pressed from the inside thereof by means of a pressure difference, thereby preventing removal of the translucent plate to the outside.

According to the present invention, a translucent plate is fitted into the recess, and hence a translucent plate can be readily positioned in the exterior surface of the translucent housing.

What is claimed is:

1. A vehicle-mounted image pickup device which introduces light having entered an image pickup main body housed in a case member through an incident window area formed in the case member, thereby capturing an image relating to vehicle surroundings, the case member comprising:

a translucent housing whose portions corresponding to the incident window area is hermetically sealed;

a flat translucent glass plate which is disposed on the incident window area of the translucent housing along an exterior surface; and an opaque layer formed on the exterior surface excluding the incident window area where the translucent plate of the translucent housing is disposed, wherein a recess is formed on the exterior surface of the incident window area of the translucent housing without penetrating into an interior surface of the translucent housing, and the flat translucent glass plate is fitted into the recess.

2. A vehicle-mounted image pickup device which introduces light having entered an image pickup main body housed in a case member through an incident window area formed in the case member, thereby capturing an image relating to vehicle surroundings, the case member comprising:

a translucent housing whose portions corresponding to the incident window area is hermetically sealed;

a flat translucent glass plate which is disposed on the incident window area of the translucent housing along an exterior surface; and an opaque layer formed on the exterior surface excluding the incident window area where the translucent plate of the translucent housing is disposed, wherein the flat translucent glass plate is bonded to the translucent housing by a translucent adhesive.

3. A vehicle-mounted image pickup device which introduces light having entered an image pickup main body housed in a case member through an incident window area formed in the case member, thereby capturing an image relating to vehicle surroundings, the case member comprising:

a translucent housing whose portions corresponding to the incident window area is hermetically sealed;

a flat translucent glass plate which is disposed on the incident window area of the translucent housing along an exterior surface; and an opaque layer formed on the exterior surface excluding the incident window area where the translucent plate of the translucent housing is disposed, wherein the translucent housing is hermetically sealed.

* * * * *